United States Patent
Hasenoehrl et al.

(10) Patent No.: US 9,276,391 B2
(45) Date of Patent: Mar. 1, 2016

(54) FAULT-TOLERANT SELF-INDICATING SURGE PROTECTION SYSTEM FOR AIRCRAFT

(71) Applicant: The Boeing Company, Chicago, IL (US)

(72) Inventors: Thomas R. Hasenoehrl, Stanwood, WA (US); John T. Paterson, Mukilteo, WA (US); Marvin Whitney, Arlington, WA (US); Kevin S. Callahan, Shoreline, WA (US); Shahriar Khosravani, Everett, WA (US)

(73) Assignee: The Boeing Company, Chicago, IL (US)

( * ) Notice: Subject to any disclaimer, the term of this patent is extended or adjusted under 35 U.S.C. 154(b) by 63 days.

(21) Appl. No.: 13/947,096

(22) Filed: Jul. 21, 2013

(65) Prior Publication Data
US 2015/0022932 A1    Jan. 22, 2015

(51) Int. Cl.
| H02G 13/00 | (2006.01) |
| H02H 3/08 | (2006.01) |
| H02H 9/04 | (2006.01) |

(52) U.S. Cl.
CPC .............. *H02G 13/60* (2013.01); *H02G 13/80* (2013.01); *H02H 3/08* (2013.01); *H02H 9/041* (2013.01); *H02H 9/042* (2013.01); *H02H 9/043* (2013.01)

(58) Field of Classification Search
CPC .......... H02G 13/60; H02G 13/80; H02H 3/08
USPC ........................................................ 361/127
See application file for complete search history.

(56) References Cited

U.S. PATENT DOCUMENTS

| 4,093,978 A * | 6/1978 | Plumer, Jr. ............. H02H 9/005 244/1 A |
| 4,739,436 A | 4/1988 | Stefani et al. |
| 5,412,526 A | 5/1995 | Kapp |
| 5,432,667 A * | 7/1995 | Rau et al. ...................... 361/124 |
| 5,761,021 A | 6/1998 | Yu |

(Continued)

FOREIGN PATENT DOCUMENTS

DE    4124321 A1    1/1993

OTHER PUBLICATIONS

Plumer, Perala, Fisher, "Lightning Protection of Aircraft", Second Edition 2004 Edition, Lighting Technologies Inc. Chapter 17: Circuit Design, Section 17.4.2: Non-Linear Resistors, Figures 17.14, 17.15, 17.16, and Table 1:Voltage Ratings.

(Continued)

*Primary Examiner* — Scott Bauer
(74) *Attorney, Agent, or Firm* — McDonnell Boehnen Hulbert & Berghoff LLP (57) ABSTRACT

A fault-tolerant self-indicating surge protector system and methods are presented. An unwanted surge of electrical energy induced by a lightning strike is directed away from a sensitive electrical or electronic component, and the unwanted surge of electrical energy is directed through series connected pairs of varistors. A voltage signal is extracted from a center tap point between the series connected pairs of the varistors, and the voltage signal is monitored for a health of the varistors. A high impedance in a varistor among the varistors is provided for a low voltage across the varistor, and a low impedance in the varistor is provided and the unwanted surge of electrical energy is diverted through the varistor in response to a high voltage across the varistor.

20 Claims, 7 Drawing Sheets

(56) References Cited

U.S. PATENT DOCUMENTS

| 6,118,256 A | 9/2000 | Willson |
| 2003/0086225 A1 | 5/2003 | Chaudhry |
| 2010/0033885 A1* | 2/2010 | Hotchkiss et al. .............. 361/56 |

OTHER PUBLICATIONS

Littelfuse, Application Note AN9767.1, "Littelfuse Varistors—Basic Properties, Terminology and Theory", Jul. 1999.

Littelfuse, Application Note AN9311. 6, "The ABCs of MOVs", Jul. 1999.

Littelfuse, Application Note AN9768, "Transient Suppression Devices and Principles", Jan. 1998.

B. Walaszczyk, Tidey, and Bellamyg,"Does Size Really Matter?— An Exploration of the Utilization of a Single Higher Energy Rated MOV vs. Paralleling Multiple Lower Energy MOVs", EC921, Littelfuse, Power Systems World Conference, Sep. 2001.

Emerson "Surge-Protection for Business-Critical Continuity", LPM/IM Series, Emerson Catalog, 2010.

Schneider Electric USA, Inc., "Surge Protective Devices and UL1449", Third Edition, Mar. 2011, 9910-0001A.

Eaton Corporation, "UL 1449 3rd Edition—Key Changes", May 2008, Technical Data TD01005005E.

Littelfuse, Application Note AN9108.4, "Littelfuse "ML" Multilayer Surface Mount Surge Suppressors", Jul. 1999.

K. B. Mc Eachron, General Electric, Co.,Thyrite, "A New Material for Lightning Arresters", Presented at the Winter Convention of the A. I. E. E., New York, N. Y., Jan. 27-31, 1930.

Extended European Search Report EP14174805.3 mailed Dec. 4, 2014.

Office Action issued in Canadian Patent Application No. 2,854,416 dated Aug. 18, 2015.

* cited by examiner

FAULT-TOLERANT SELF-INDICATING SURGE PROTECTION SYSTEM FOR AIRCRAFT

FIELD

Embodiments of the present disclosure relate generally to electrical energy surge protection. More particularly, embodiments of the present disclosure relate to electrical energy surge protection systems.

BACKGROUND

Energy levels produced from lightning, electromagnetic pulses, and electromagnetic discharge play havoc on airplane electrical power, controlling, and indication systems. Lightning effects can penetrate electrical systems on aircraft due to any external connections such as hydraulic tubes, air-data sensors, antennas and electrical cables from engines to the internal electrical wiring bay.

SUMMARY

A fault-tolerant self-indicating surge protector system and methods are presented. A surge protection module couples to a power line and a surge grounding line, and comprises a first varistor module and a second varistor module. The first varistor module couples to the power line and a middle node, and comprises a first varistor. The first varistor provides a high impedance between the power line and the middle node if a first varistor voltage from the power line to the middle node is below a first voltage threshold. The first varistor absorbs a surge current from the power line if the first varistor voltage is above the first voltage threshold. The second varistor module couple to the middle node and the surge grounding line, and comprises a second varistor. The second varistor provides a high impedance between the middle node and the surge grounding line if a second varistor voltage from the middle node to the surge grounding line is below a first voltage threshold. The second varistor absorbs a surge current from the power line if the second varistor voltage is above the second voltage threshold. A fault detection circuit indicates a fault in the at least one surge protection module based on a tap voltage on the middle node.

In this manner, embodiments of the disclosure provide a fault-tolerant self-indicating surge protector system that protects against surges and indicates internal faults such as blown varistors.

In an embodiment, a fault-tolerant self-indicating surge protector system comprises a surge protection module and a fault detection circuit. The surge protection module couples to a power line and a surge grounding line, and comprises a first varistor module and a second varistor module. The first varistor module couples to the power line and a middle node, and comprises a first varistor. The first varistor provides a high impedance between the power line and the middle node if a first varistor voltage from the power line to the middle node is below a first voltage threshold. The first varistor absorbs a surge current from the power line if the first varistor voltage is above the first voltage threshold. The second varistor module couple to the middle node and the surge grounding line, and comprises a second varistor. The second varistor provides a high impedance between the middle node and the surge grounding line if a second varistor voltage from the middle node to the surge grounding line is below a first voltage threshold. The second varistor absorbs a surge current from the power line if the second varistor voltage is above the second voltage threshold. The fault detection circuit indicates a fault in the at least one surge protection module based on a tap voltage on the middle node.

In another embodiment, a method for configuring a fault-tolerant self-indicating surge protection system configures a first varistor to provide a high impedance between a power line and a middle node if a first varistor voltage from the power line to the middle node is below a first voltage threshold. The method further configures the first varistor to absorb a surge current from the power line if the first varistor voltage is above the first voltage threshold. The method further configures a second varistor to provide a high impedance between the middle node and a surge grounding line if a second varistor voltage from the middle node to the surge grounding line is below a second voltage threshold. The method further configures the second varistor to absorb a surge current from the power line if the second varistor voltage is above the second voltage threshold. The method further configures a first varistor module comprising the first varistor to couple to the power line and a middle node. The method further configures a second varistor module comprising the second varistor to couple to the middle node and the surge grounding line. The method further configures at least one surge protection module comprising the first varistor module and the second varistor module to couple to the power line and the surge grounding line. The method further configures a fault detection circuit to indicate a fault in the at least one surge protection module based on a tap voltage on the middle node.

In a further embodiment, a method for fault-tolerant self-indicating surge protection induced by lightning directs an unwanted surge of electrical energy induced by a lightning strike away from a sensitive electrical or electronic component. The method further directs the unwanted surge of electrical energy through a plurality of series connected pairs of metal oxide varistors. The method further extracts a voltage signal from a center tap point between the series connected pairs of the metal oxide varistors. The method further monitors the voltage signal for a health of the metal oxide varistors. The method further provides a high impedance in a metal oxide varistor among the metal oxide varistors for a low voltage across the metal oxide varistor. The method further provides a low impedance in the metal oxide varistor and diverts the unwanted surge of electrical energy through the metal oxide varistor in response to a high voltage across the metal oxide varistor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to heat transfer, thermal actuation, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, electric power surge protection for a vehicle. Embodiments of the disclosure, however, are not limited to such vehicle electric power surge protection applications, and the techniques described herein may also be utilized in other applications. For example but without limitation, embodiments may be applicable to scientific systems, weapon systems, or other application. The vehicle may comprise, for example but without limitation, manned and unmanned vehicle, spacecraft, launch vehicles and other vehicle operating in situations with exposure to electrical surge.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
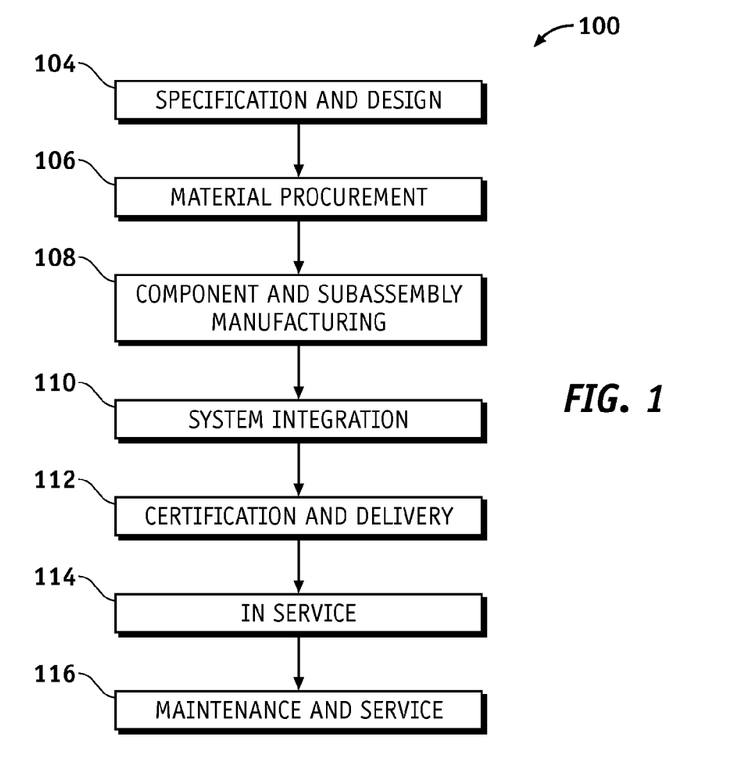
FIG. 1 is an illustration of a flow diagram of an exemplary aircraft production and service methodology.
Figure 2:
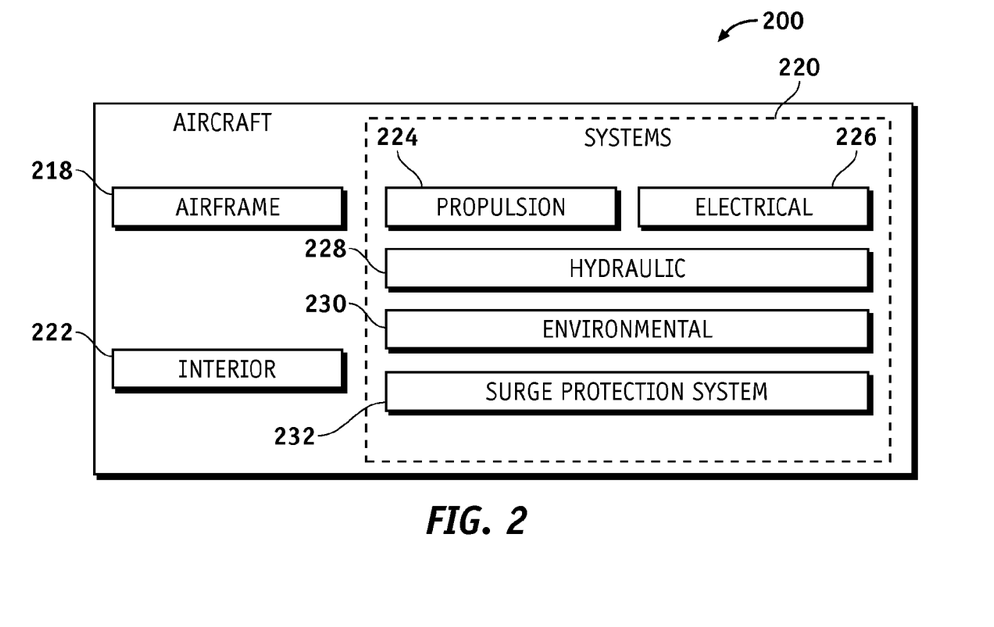
FIG. 2 is an illustration of an exemplary block diagram of an aircraft.

Referring more particularly to the drawings, configurations of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 2, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental control system 230, and a surge protection system 232. Any number of other systems may also be included. Although an aerospace example is shown, the configurations of the disclosure may be applied to other industries.

Apparatus and methods configured herein may be employed during any one or more of the stages of the method 100. For example, components or subassemblies corresponding to production process 108 may be fabricated or manufactured in a manner similar to components or subassemblies produced while the aircraft 200 is in service. In addition, one or more apparatus configurations, method configurations, or a combination thereof may be utilized during production processes 108 and 110, for example, by substantially expediting assembly of or reducing the cost of an aircraft 200. Similarly, one or more of apparatus configurations, method configurations, or a combination thereof may be utilized while the aircraft 200 is in service, for example and without limitation, to maintenance and service 116.

Embodiments provide a system allowing airplane systems to perform their intended function when exposed to electromagnetic threats. In composite airplane, the voltage and current lightning threat levels have increased compared to those of an aluminum airplane.

Existing systems use Transient Voltage Suppression (TVS) devices, such as transorbs, zeners, etc., throughout an airplane electrical installation for protection against lightning and electromagnetic pulses. These TVS devices are used to direct unwanted energy away from sensitive electrical or electronic components. Part of a problem with the existing systems is that there is no indication scheme of when these TVS devices start to degrade or fail, often resulting in sensitive electrical/electronic components becoming non-optimal. Also, some of the power system wiring required either copper-mesh shielding wrapped as a contiguous over-sleeve around whole length of existing wire-harness increasing the weight of the aircraft.

Embodiments provide a system comprising a health monitoring system for new types of TVS devices such as varistors to indicate when the devices have either failed shorted, failed opened, or degraded upon their usefulness.

In this manner, embodiments use varistors devices as the TVS component between a 230 and 115 alternating current voltage ($V_{AC}$) lines to neutral combined with a monitoring electronic circuit to provide a surge protection system (SPS) that can annunciate the health of the varistors devices as explained in more detail below.

Figure 3:
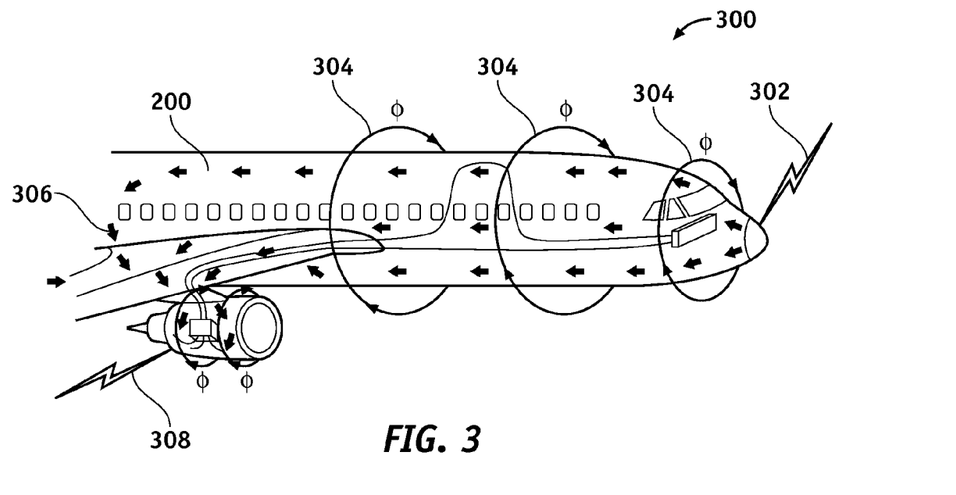
FIGS. 3 and 4 are illustrations of scenarios showing how a lightning strike may effect electrical systems on an aircraft.
Figure 4:
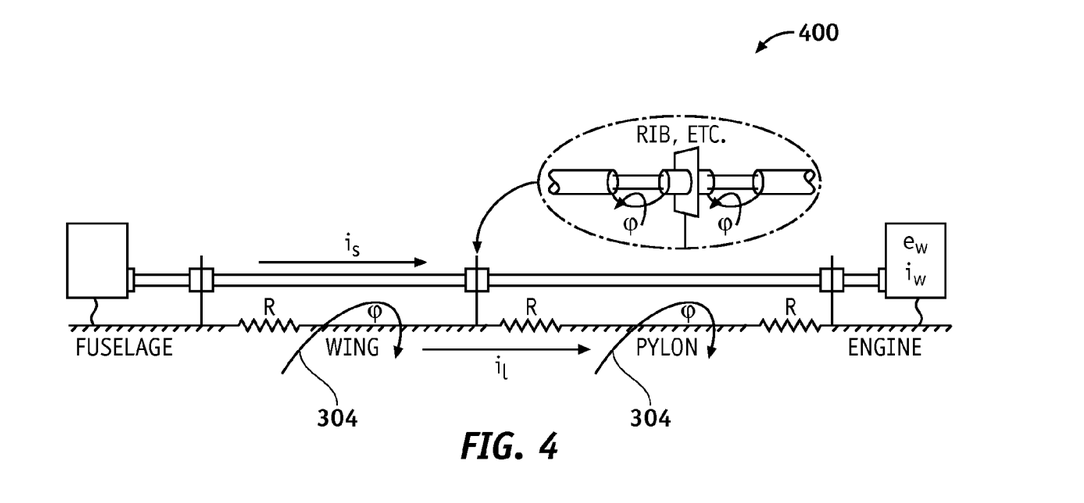

FIGS. 3 and 4 are illustrations of scenarios 300 and 400 showing how a lightning strike 302 may effect electrical systems on the aircraft 200. The lightning strike 302 may contact and travel through the aircraft 200 (e.g., along a fuselage, a wing, a pylon, an engine, a rib, etc.) and leave as shown by exiting lightning strike 308. The lightning strike 302 may generate a magnetic flux φ 304 that generates lightening current flow 306 in the aircraft 200. The magnetic flux φ 304 can interact with interconnecting cables of the aircraft 200 electrical systems 226. Lightning effects may penetrate aircraft 200 electrical systems 226 due to any external connections such as hydraulic tubes, air-data sensors, antennas and electrical cables from the engines to the internal electrical wiring bay. These effects can cause high-voltage spikes, frequently exceeding 1200 Volt (V) in signal wires connected to low-voltage electronics. Also, these effects can cause high-current surges in low-impedance power wiring, sufficient to disrupt the sensors of protection circuits and cause power malfunctions; in some cases these current surges look like a; temporary over-current faults and can cause control contactors to trip off-line.

Some configurations provide a surge protection system to protect sensitive electrical/electronic components from direct-attachment and indirect-induced effects of lightning. The surge protection system described herein provides customized varistors that can provide high impedance during normal operation and be able to direct energy pulses away from sensitive electrical/electronic components. High impedance may comprise, for example but without limitation, a substantially isolating impedance, an impedance that substantially isolates a power line 514 (FIG. 7) from a surge grounding line 512 (FIG. 7), an impedance that substantially isolates a first electrical node (e.g., the power line 514 or a middle node 710 (FIG. 7)) from a second electrical node (e.g., the middle node 710 or the surge grounding line 512), or other suitable high impedance. The high impedance in a Metal Oxide Varistor (MOV) may comprise, for example but without limitation, an about 100 mega Ohm resistance, or other suitable impedance. Additionally, the surge protection system provides capability to monitor health of the varistors. By having a monitoring electronic circuit possibility of causing anomaly to sensitive electrical/electronic components after the varistors have degraded or failed is reduced. A varistor that is degraded or failed may comprise, for example but without limitation, a varistor comprising an open circuit, a varistor comprising a short circuit, or other reduced functionality.

Figure 5:
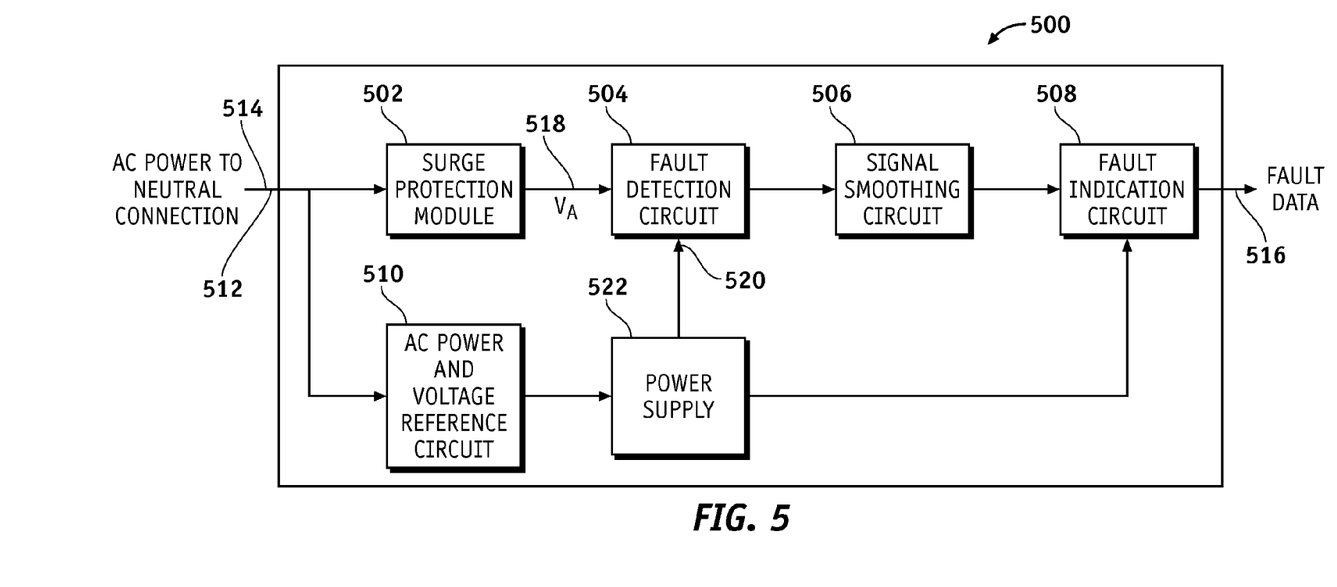
FIG. 5 is an illustration of a functional block diagram of a surge protection system according to an embodiment of the disclosure.

FIG. 5 is an illustration of a functional block diagram of a surge protector system (SPS) 500 according to an embodiment of the disclosure. The SPS 500 may comprise: a transient voltage suppression (TVS) circuit 502 (surge protection module 502), an electrical monitoring circuit 504 (fault detection circuit 504), a signal smoothing circuit 506, a fault indication circuit 508, an alternate current (AC) power and voltage reference circuit 510, and a power supply 522.

The SPS 500 monitors the AC power between the AC power line 514 and surge grounding line 512. When an excessive energy level event occurs, the system 500 prevents anomaly to airplane sensitive electrical/electronic components. If the components of the SPS 500 become non-optimal during the high energy level event, then fault data 516 may be sent out to a computing hardware (not shown) indicating a fault. The SPS 500 works with 115 Volt and 230 Volt AC power.

Figure 7:
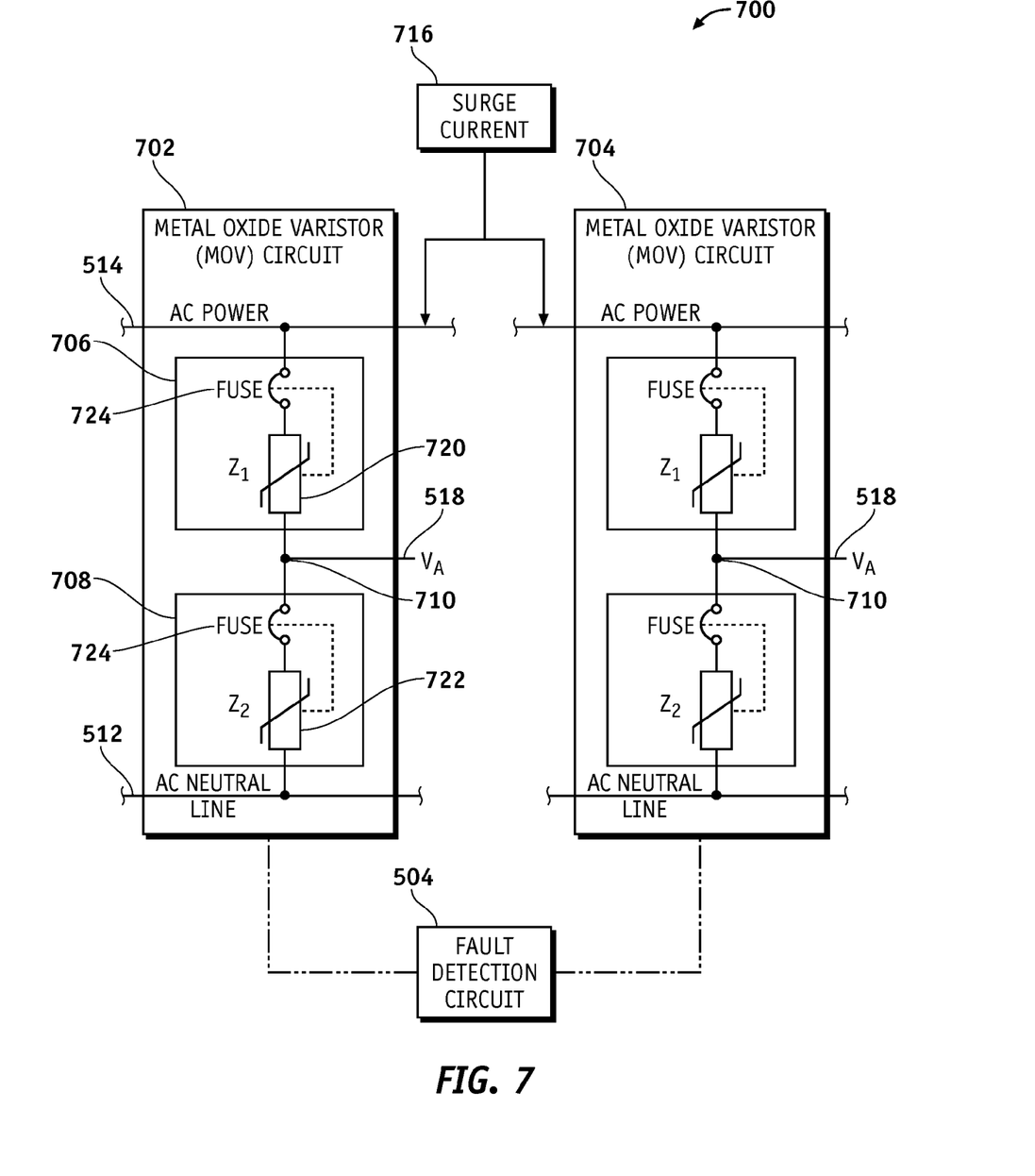
FIG. 7 is an illustration of electrical circuits of a plurality of varistors according to an embodiment of the disclosure.

The surge protection module 502 is configured to directly send a health monitoring voltage such as a tap voltage $V_A$ 518 to the fault detection circuit 504. The surge protection module 502 may comprise two varistors 720/722 (FIG. 7) connected in series between a single AC power line 514 and the surge grounding line 512 as shown in FIG. 7. The system 500 may however house, for example but without limitation, two, four, six, or any number of varistors to meet energy levels required for airplane installation.

The fault detection circuit 504 is configured to receive the tap voltage $V_A$ 518 from the surge protection module 502. If the tap voltage $V_A$ 518 is out of its tolerance range, short circuited, or open circuited, the electrical monitoring circuit 504 will report a fault. The fault detection circuit 504 receives its power from the power supply 522 via an AC input 520. The fault detection circuit 504 also provides indication when power is removed.

The signal smoothing circuit 506 is configured to smooth the signal from the fault detection circuit 504 and send the smoothed signal to the fault indication circuit 508.

The fault indication circuit 508 provides an indication for faults to a computing equipment via the fault data 516 if a fault occurs.

The AC power and voltage reference circuit 510 is configured to provide a reference voltage.

The power supply 522 is configured to provide power to the fault detection circuit 504 and the fault indication circuit 508.

Figure 6:
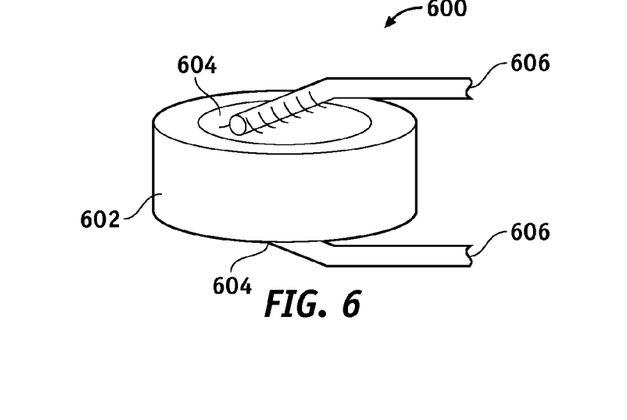
FIG. 6 is an illustration a radial disc varistor that can be used in the system of FIG. 5.

FIG. 6 is an illustration of a radial disc varistor 600 that can be used in the TVS circuit 502 in the SPS 500 system of FIG. 5. An outside layer 602 may be formed from, for example but without limitation, ceramic material, or other material. Electrode plates 604 comprising connecting leads 606 may be formed, for example but without limitation, from conductive zinc oxide grains doped with bismuth, cobalt, manganese, and other metal oxides.

A commonly used varistor is known as a Metal Oxide Varistor (MOV). Operation of the MOV is substantially based upon its composition and structure. The MOV contains a ceramic mass of zinc oxide grains in a matrix form of other metal oxides (such as small amounts of bismuth, cobalt, & manganese) sandwiched between two metal plates called electrodes. The boundary between each small grain and its neighbor forms a diode junction element. These boundaries only allow current to flow in one direction. The orientation of the grains in the MOV material between the two metal electrode plates such as the electrode plates 604 is electrically equivalent to a network of back-to-back diode pairs, each pair in parallel with many other pairs.

If the applied voltage across the electrode plates 604 is less than the voltage required to break down the granular diode junction in the MOV material, then a small amount of leakage current (similar to diode junction reverse leakage current) will flow through the ceramic mass of the MOV. When the applied voltage across the electrode plates becomes large enough to be in the breakdown region of the MOV material, a large amount of current will flow through the ceramic mass of the MOV. The breakdown voltage region of the MOV material is defined on the manufacturer specification sheets as the minimum (Vnom_min) and maximum (Vnom_max) nominal voltages.

The performance of the MOV is non-linear voltage/current attributes in nature, where the MOV has high resistance at low voltages and low resistance at high voltages. The MOV will shunt uncontrolled current created by high voltages away from sensitive power electronic components. A conductive medium in the MOV regains its diode junction characteristic in absence of a high voltage across the electrode plates 604, resuming a normal operation of providing operational voltage and current to the sensitive electrical or electronic component.

A customized varistor package to operate in a commercial airplane AC power environment is provide herein. A set of clamping voltage level requirements for varistors 720/722 to be used on commercial airplane's 115V and 230V AC power systems are provided. When a transient voltage spike exceeds a threshold level of varistors 720/722, these devices will instantaneously clamp (short circuited), directing the energy away from sensitive airplane electronic components. Once the energy threat is not present, the resistance of the varistors 720/722 will slowly return to a high impedance state.

FIG. 7 is an illustration of surge protection circuit 700/502 showing two surge protection modules 702 and 704 each comprising two varistor modules 706 and 708 (MOV modules 706 and 708) according to an embodiment of the disclosure. The varistor modules 706 and 708 are connected in series between a single AC power line 514 and the surge grounding line 512.

The center tap point 710 (middle node 710) indicates the tap voltage $V_A$ 518, which is the monitoring point for the health of the varistor modules 706 and 708 of the surge protection circuit 502 (FIG. 5). The tap voltage $V_A$ 518 is fed directly to the fault detection circuit 504. If any of these two varistor modules 706 and 708 is out of its tolerance range, short circuited, or open circuited, the fault detection circuit 504 will report a non-optimality in the surge protection circuit 502. Each varistor module 706 and 708 is able to absorb at least 250 Joules of energy during high voltage spikes. Since there are two of these components connected in series, the total energy absorption during high voltage spikes will be more than 500 Joules.

The surge protection module 702/704 is configured to couple to the AC power line 514 and a surge grounding line 512.

The varistor module 706 comprises the varistor 720 and is configured to couple to the AC power line 514 and the middle node 710.

The varistor 720 is configured to provide high impedance between the AC power line 514 and the middle node 710 if a voltage across the varistor 720 from the AC power line 514 to the middle node 710 is below a first voltage threshold. The varistor 720 absorbs a surge current 716 (unwanted surge of electrical energy 716) from the AC power line 514 if the voltage across the varistor 720 from the AC power line 514 to the middle node 710 is above the first voltage threshold. The first voltage threshold may comprise, for example but without limitation, about 190 Volts rms (about 270 Volts peak) for a 115 VAC rms power line, about 325 Volts rms (about 425 Volts peak) for a 230 VAC rms power line, or other voltage threshold.

The varistor module 708 comprises the varistor 722 and is configured to couple to the middle node 710 and the surge grounding line 512.

The varistor 722 provides a high impedance between the middle node 710 and the surge grounding line 512 if the varistor 722 voltage from the middle node 710 to the surge grounding line 512 is below a second voltage threshold. The varistor 722 absorbs the surge current 716 from the AC power line 514 if the varistor 722 voltage is above the second voltage threshold. The second voltage threshold may comprise, for example but without limitation, about 190 Volts rms (about 270 Volts peak) for a 115 VAC rms power line, about 325 Volts rms (about 425 Volts peak) for a 230 VAC rms power line, or other voltage threshold.

The varistor module 706 and the varistor module 708 each further comprise a fuse 724 in series with the varistor 720 and the varistor 722 respectively. The fuse 724 comprises a higher breakdown voltage than the varistor 720 and the varistor 722. The fuse 724 in the varistor module 706 may be referred to as a first fuse 724 and the fuse 724 in the varistor module 708 may be referred to as a second fuse 724.

The fault detection circuit 504 is configured to indicate a fault in the at least one surge protection module 702/704 based on the tap voltage $V_A$ 518 on the middle node 710. The fault detection circuit 504 indicates a fault in the varistor module 706 if the tap voltage 518 approaches a voltage of the surge grounding line 512, and the varistor module 708 if the tap voltage 518 approaches a voltage of the AC power line 514.

Figure 8:
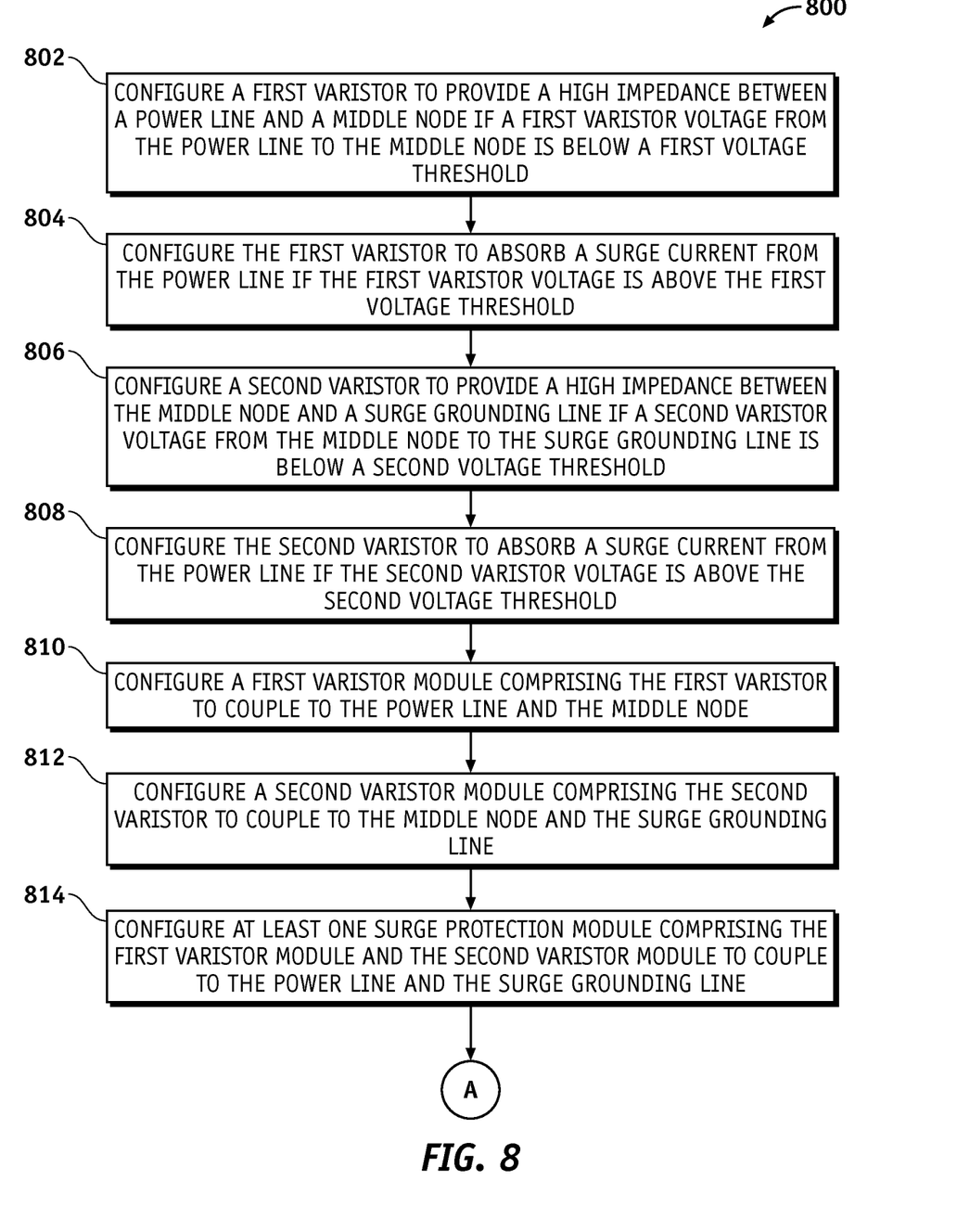
FIG. 8 is an illustration of an exemplary flowchart showing a process for configuring a fault-tolerant self-indicating surge protection system according to an embodiment of the disclosure.

FIG. 8 is an illustration of an exemplary flowchart showing a process 800 for configuring a fault-tolerant self-indicating surge protection system according to an embodiment of the disclosure. The various tasks performed in connection with process 800 may be performed by software, hardware, firmware, computer-readable software, computer readable storage medium, a computer-readable medium comprising computer executable instructions for performing the process method, mechanically, or any combination thereof. The process 800 may be recorded in a computer-readable medium such as a semiconductor memory, a magnetic disk, an optical disk, and the like, and can be accessed and executed, for example, by a computer CPU comprising hardware and software such as a processor module in which a computer-readable medium is stored.

For illustrative purposes, the following description of process 800 may refer to elements mentioned above in connection with FIGS. 5-7. In some embodiments, portions of the process 800 may be performed by different elements of the system 500 such as: the surge protection circuit 502, the fault detection circuit 504, the signal smoothing circuit 506, the fault indication circuit 508, the AC power and voltage reference circuit 510, the power supply 522, the AC power line 514, the surge grounding line 512, the varistors modules 706 and 708, the varistor 720/722, etc. It should be appreciated that the process 800 may include any number of additional or alternative tasks, the tasks shown in FIG. 8 need not be performed in the illustrated order, and the process 800 may be incorporated into a more comprehensive procedure or process having additional functionality not described in detail herein. Process 800 may comprise functions, material, and structures that are similar to the embodiments shown in FIGS. 5-7. Therefore, common features, functions, and elements may not be redundantly described here.

Process 800 may begin by configuring a first varistor such as the first varistor 720 to provide a high impedance between a power line such as the power line 514 and a middle node such as the middle node 710 if a first varistor voltage from the power line 514 to the middle node 710 is below a first voltage threshold (task 802).

Process 800 may continue by configuring the first varistor 720 to absorb a surge current from the power line 514 if the first varistor voltage is above the first voltage threshold (task 804).

Process 800 may continue by configuring a second varistor such as the second varistor 722 to provide a high impedance between the middle node 710 and a surge grounding line such as the surge grounding line 512 if a second varistor voltage from the middle node 710 to the surge grounding line 512 is below a second voltage threshold (task 806).

Process 800 may continue by configuring the second varistor 722 to absorb a surge current such as the surge current 716 from the power line 514 if the second varistor voltage is above the second voltage threshold (task 808).

Process 800 may continue by configuring a first varistor module such as the first varistor module 706 comprising the first varistor 720 to couple to the power line 514 and the middle node 710 (task 810).

Process 800 may continue by configuring a second varistor module such as the second varistor module 708 comprising the second varistor 722 to couple to the middle node 710 and the surge grounding line 512 (task 812).

Process 800 may continue by configuring at least one surge protection module such as the surge protection module 702/704 comprising the first varistor module 706 and the second varistor module 708 to couple to the power line 514 and the surge grounding line 512 (task 814).

Process 800 may continue by configuring a fault detection circuit such as the fault detection circuit 504 to indicate a fault in the at least one surge protection module 702/704 based on a tap voltage such as the tap voltage 518 on the middle node 710 (task 816). The at least one surge protection module 702/704 may comprise a plurality of surge protection modules 706/708 providing fault-tolerant redundancy in the surge protection modules 706/708.

Process 800 may continue by configuring the fault detection circuit 504 to indicate a fault (first varistor fault) in the first varistor module if the tap voltage 518 approaches a voltage of the surge grounding line 512 (task 818).

Process 800 may continue by configuring the fault detection circuit 504 to indicate a fault (second varistor fault) in the second varistor module if the tap voltage 518 approaches a voltage of the power line 514 (task 820).

Process 800 may continue by configuring a first fuse such as the first fuse 724 in the first varistor module 706 in series with the first varistor 720 (task 822).

Process 800 may continue by configuring a second fuse such as the second fuse 724 in the second varistor module 708 in series with the second varistor 722 (task 824).

Process 800 may continue by configuring the first fuse 724 and the second fuse 724 to comprise a higher breakdown voltage than the first varistor 720 and the second varistor 722 respectively (task 826).

Process 800 may continue by configuring the first varistor 720 and the second varistor 722 to comprise a metal oxide, a ceramic, or a combination thereof (task 828).

Figure 9:
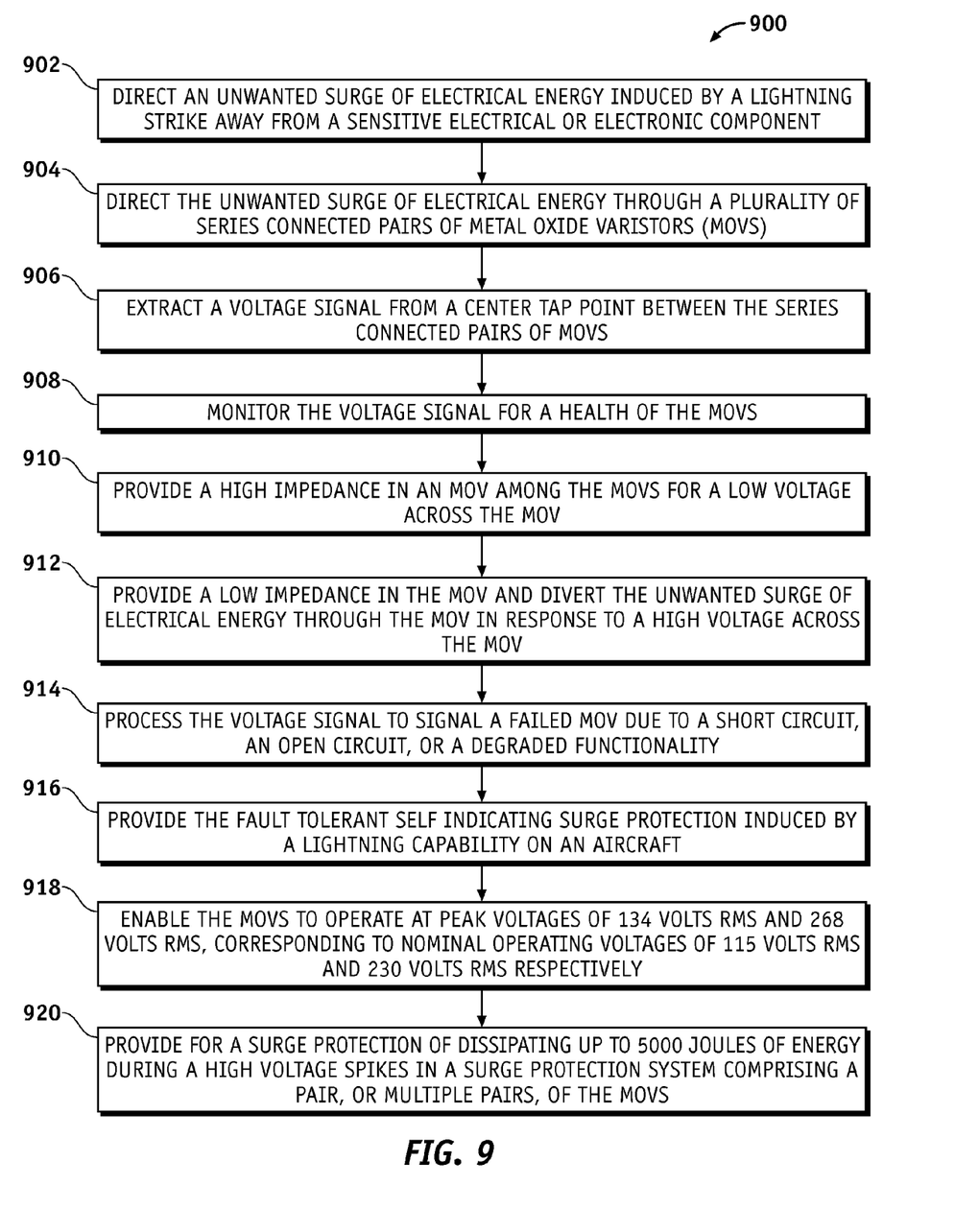
FIG. 9 is an illustration of an exemplary flowchart showing a process for operating a fault-tolerant self-indicating surge protection system according to an embodiment of the disclosure.

FIG. 9 is an illustration of an exemplary flowchart showing a process 900 for operating a fault-tolerant self-indicating surge protection system according to an embodiment of the disclosure. The various tasks performed in connection with process 900 may be performed mechanically, by software, hardware, firmware, computer-readable software, computer readable storage medium, or any combination thereof. The process 900 may be recorded in a computer-readable medium such as a semiconductor memory, a magnetic disk, an optical disk, and the like, and can be accessed and executed, for example, by a computer CPU such as a processor module in which a computer-readable medium is stored.

For illustrative purposes, the following description of process 900 may refer to elements mentioned above in connection with FIGS. 5-7. In some embodiments, portions of the process 900 may be performed by different elements of the system 500 such as: the surge protection circuit 502, the fault detection circuit 504, a signal smoothing circuit 506, a fault indication circuit 508, an AC power and voltage reference circuit 510, and a power supply 522, the AC power line 514, the surge grounding line 512, varistors modules 706 and 708, varistor 720/722, etc. It should be appreciated that process 900 may include any number of additional or alternative tasks, the tasks shown in FIG. 9 need not be performed in the illustrated order, and the process 900 may be incorporated into a more comprehensive procedure or process having additional functionality not described in detail herein.

Process 900 may begin by directing an unwanted surge of electrical energy such as the unwanted surge of electrical energy 716 induced by a lightning strike such as the lightning strike 302 away from a sensitive electrical or electronic component (task 902).

Process 900 may continue by directing the unwanted surge of electrical energy 716 through a plurality of series connected pairs of metal oxide varistors (MOVs) such as MOVs 720/722 (task 904). The MOVs 720/722 may comprise a voltage-sensitive semi-conductor compounds, customized to a voltage trigger value commensurate with operating at peak voltages of 134 Volts rms or 268 Volts rms corresponding to nominal operating voltages of 115 Volts rms or 230 Volts rms respectively, and an in-body thermal fusible link, packaged in epoxy alleviating a source of ignition in an event of a MOV short-circuit.

Process 900 may continue by extracting a voltage signal such as the voltage signal 518 (tap voltage 518) from a center tap point such as the center tap point 710 (middle node 710) between the series connected pairs of MOVs 720/722 (task 906).

Process 900 may continue by monitoring the voltage signal 518 for a health of the MOVs 720/722 (task 908).

Process 900 may continue by providing a high impedance in an MOV 720/722 among the MOVs 720/722 for a low voltage across the MOV 720/722 (task 910). The high impedance in the MOV 720/722 may comprise, for example but without limitation, an about 100 mega Ohm resistance, or other suitable impedance. The low voltage may comprise, for example but without limitation, a voltage below about 180V for a 115V system, a voltage below about 360V for a 230V system, or other suitable voltage.

Process 900 may continue by providing a low impedance in the MOV 720/722 and diverting the unwanted surge of electrical energy 716 through the MOV 720/722 in response to a high voltage across the MOV 720/722 (task 912).

Process 900 may continue by processing the voltage signal 518 to signal a failure of one of the metal oxide varistors (failed MOV) 720/722 due to a short circuit, an open circuit, or a degraded functionality (task 914).

Process 900 may continue by providing a fault-tolerant self-indicating surge protection induced by a lightning capability on an aircraft such as the aircraft 200 (task 916).

Process 900 may continue by enabling the MOVs 720/722 to operate at peak voltages of 134 Volts rms or 268 Volts rms corresponding to nominal operating voltages of 115 Volts rms or 230 Volts rms respectively (task 918).

Process 900 may continue by providing for a surge protection of dissipating up to 5000 joules of energy during a high voltage spikes in a surge protection system comprising a pair or multiple pairs of the MOVs 720/722 (task 920).

In this manner, embodiments of the disclosure provide a fault-tolerant self-indicating surge protector system that protects against surges and in indicates internal faults such as blown varistors.

While at least one example configuration has been presented in the foregoing detailed description, it should be appreciated that a vast number of variations exist. It should also be appreciated that the example configuration or configurations described herein are not intended to limit the scope, applicability, or configuration of the subject matter in any way. Rather, the foregoing detailed description will provide those skilled in the art with a convenient road map for implementing the described configuration or configurations. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" should be interpreted to mean that one element/node/feature is directly joined to (or directly communicates with) another element/node/feature, and not necessarily mechanically. Likewise, unless expressly stated otherwise, "coupled" should be interpreted to mean that one element/node/feature is directly or indirectly joined to (or directly or indirectly communicates with) another element/node/feature, and not necessarily mechanically. Thus, although FIGS. 5 and 7 depict example arrangements of elements, additional intervening elements, devices, features, or components may be present in a configuration of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases shall not be read to mean that the narrower case is intended or required in instances where such broadening phrases may be absent.

The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A fault-tolerant self-indicating surge protector system, the system comprising:
    at least one surge protection module configured to couple to a power line and a surge grounding line to direct an unwanted surge of electrical energy induced by a lightning strike away from a sensitive electrical or electronic component in an aircraft to protect the aircraft from the lighting strike, comprising:
        a first varistor module configured to couple to the power line and a middle node, and comprising a first varistor configured to:
            provide a first high impedance between the power line and the middle node if a first varistor voltage from the power line to the middle node is below a first voltage threshold, wherein the first voltage threshold is greater than a peak voltage level of the power line; and
            absorb a surge current from the power line if the first varistor voltage is above the first voltage threshold; and
        a second varistor module configured to couple to the middle node and the surge grounding line, and comprising a second varistor configured to:
            provide a second high impedance between the middle node and the surge grounding line if a second varistor voltage from the middle node to the surge grounding line is below a second voltage threshold; and
            absorb the surge current from the power line if the second varistor voltage is above the second voltage threshold; and
    a fault detection circuit configured to indicate a fault in the at least one surge protection module based on a tap voltage on the middle node.

2. The system of claim 1, wherein the first varistor module and the second varistor module each further comprise a fuse in series with the first varistor and the second varistor respectively.

3. The system of claim 2, wherein the fuse comprises a higher breakdown voltage than the first varistor and the second varistor.

4. The system of claim 1, wherein the fault detection circuit indicates a fault in:
    the first varistor module if the tap voltage approaches a first voltage of the surge grounding line; and
    the second varistor module if the tap voltage approaches a second voltage of the power line.

5. The system of claim 1, wherein the first varistor and the second varistor comprise a metal oxide, a ceramic, or a combination thereof.

6. The system of claim 1, wherein the at least one surge protection module comprises a plurality of surge protection modules providing fault-tolerant redundancy in the surge protection modules.

7. A method for configuring a fault-tolerant self-indicating surge protection system, the method comprising:
    configuring a first varistor to provide a first high impedance between a power line in an aircraft and a middle node if a first varistor voltage from the power line to the middle node is below a first voltage threshold, wherein the first voltage threshold is greater than a peak voltage level of the power line;
    configuring the first varistor to absorb a surge current from a lightning strike on the aircraft on the power line if the first varistor voltage is above the first voltage threshold to direct an unwanted surge of electrical energy induced by the lightning strike away from a sensitive electrical or electronic component in the aircraft to protect the aircraft from the lighting strike;

configuring a second varistor to provide a second high impedance between the middle node and a surge grounding line in the aircraft if a second varistor voltage from the middle node to the surge grounding line is below a second voltage threshold;

configuring the second varistor to absorb the surge current from the lightning strike on the aircraft on the power line if the second varistor voltage is above the second voltage threshold to direct the unwanted surge of electrical energy induced by the lightning strike away from the sensitive electrical or electronic component in the aircraft to protect the aircraft from the lighting strike;

configuring a first varistor module comprising the first varistor to couple to the power line and the middle node;

configuring a second varistor module comprising the second varistor to couple to the middle node and the surge grounding line;

configuring at least one surge protection module comprising the first varistor module and the second varistor module to couple to the power line and the surge grounding line; and configuring a fault detection circuit to indicate a fault in the at least one surge protection module based on a tap voltage on the middle node.

8. The method of claim 7, further comprising:
configuring the fault detection circuit to indicate a first varistor fault in the first varistor module if the tap voltage approaches a first voltage of the surge grounding line; and configuring the fault detection circuit to indicate a second varistor fault in the second varistor module if the tap voltage approaches a second voltage of the power line.

9. The method of claim 7, further comprising:
configuring a first fuse in the first varistor module in series with the first varistor; and configuring a second fuse in the second varistor module in series with the second varistor.

10. The method of claim 9, further comprising configuring the first fuse and the second fuse to comprise a higher breakdown voltage than the first varistor and the second varistor respectively.

11. The method of claim 7, further comprising configuring the first varistor and the second varistor to comprise a metal oxide, a ceramic, or a combination thereof.

12. The method of claim 7, further comprising configuring the at least one surge protection module to comprise a plurality of surge protection modules providing fault-tolerant redundancy in the surge protection modules.

13. A method for fault-tolerant self-indicating surge protection induced by lightning, the method comprising:

directing an unwanted surge of electrical energy induced by a lightning strike away from a sensitive electrical or electronic component in an aircraft;

directing the unwanted surge of electrical energy through a plurality of series connected pairs of metal oxide varistors;

extracting a voltage signal from a center tap point between the series connected pairs of the metal oxide varistors;

monitoring the voltage signal for a health of the metal oxide varistors;

providing a high impedance in a metal oxide varistor among the metal oxide varistors for a low voltage across the metal oxide varistor; and providing a low impedance in the metal oxide varistor and diverting the unwanted surge of electrical energy through the metal oxide varistor in response to a high voltage across the metal oxide varistor.

14. The method of claim 13, further comprising processing the voltage signal to signal a failure of one of the metal oxide varistors due to a short circuit, an open circuit, or a degraded functionality.

15. The method of claim 14, further comprising processing the voltage signal via the metal oxide varistor comprising:

a voltage-sensitive semi-conductor customized to a voltage trigger value commensurate with operating at peak voltages of 134 Volts rms or 268 Volts rms corresponding to nominal operating voltages of 115 Volts rms or 230 Volts rms respectively; and an in-body thermal fusible link, packaged in epoxy alleviating a source of ignition in an event of a metal oxide varistor short-circuit.

16. The method of claim 13, further comprising operating a conductive medium in the metal oxide varistor configured to regain its diode junction characteristic in absence of a high voltage across electrodes, resuming a normal operation of providing operational voltage and current to the sensitive electrical or electronic component.

17. The method of claim 13, further comprising inducing the fault-tolerant self-indicating surge protection by a lightning capability on the aircraft.

18. The method of claim 13, further comprising enabling the metal oxide varistors to operate at peak voltages of 134 Volts rms or 268 Volts rms corresponding to nominal operating voltages of 115 Volts rms or 230 Volts rms respectively.

19. The method of claim 13, further comprising dissipating up to 5000 joules of energy during a high voltage spike in a surge protection system comprising a pair, or multiple pairs, of the metal oxide varistors.

20. The method of claim 13, further comprising operating the at least one surge protection module comprising a plurality of surge protection modules providing fault-tolerant redundancy in the surge protection modules.

* * * * *